United States Patent [19]
Tanaka et al.

[11] Patent Number: 5,224,031
[45] Date of Patent: Jun. 29, 1993

[54] SIGNAL TRANSFER SYSTEM OF PROGRAMMABLE CONTROLLER

[75] Inventors: Kunio Tanaka, Akishima; Yoshiharu Saiki, Yamanashi, both of Japan

[73] Assignee: Fanuc Ltd., Minamitsuru, Japan

[21] Appl. No.: 690,997

[22] PCT Filed: Oct. 24, 1990

[86] PCT No.: PCT/JP90/01378

§ 371 Date: Jul. 1, 1991

§ 102(e) Date: Jul. 1, 1991

[87] PCT Pub. No.: WO91/06900

PCT Pub. Date: May 16, 1991

[30] Foreign Application Priority Data

Nov. 7, 1989 [JP] Japan .................. 1-289589

[51] Int. Cl.⁵ .................................. G05B 11/01
[52] U.S. Cl. .................................. 364/140; 395/275; 364/DIG. 1; 364/238.2; 364/238.3
[58] Field of Search ............ 364/140, 131-134, 364/238.2, 238.3; 395/275

[56] References Cited

U.S. PATENT DOCUMENTS

| | | | |
|---|---|---|---|
| 4,455,621 | 6/1984 | Pelley et al. | 364/140 |
| 4,831,582 | 5/1989 | Miller et al. | 364/134 |
| 4,878,002 | 10/1989 | Hentzig et al. | 364/132 |
| 5,032,975 | 7/1991 | Yamamoto et al. | 364/134 |

FOREIGN PATENT DOCUMENTS 59-85502 5/1984 Japan .
5930108 2/1988 Japan .
63-94303 4/1988 Japan .

*Primary Examiner*—Jerry Smith
*Assistant Examiner*—Jim Trammell
*Attorney, Agent, or Firm*—Staas & Halsey

[57] ABSTRACT

Disclosed is a signal transfer control system of a programmable controller for transferring I/O signals between the PC and an external device. An I/O unit (26) includes an I/O signal region (1) for storing I/O signals transferred or received to or from an external device, and mapping data (2) for defining the mapping of the I/O signal region (1). Further, a RAM (23) of the PC includes point data (3) for defining the address to which I/O signals from the mapping data (2) are to be transferred, and an I/O data region (4) for storing the I/O data. Input signals are stored in the I/O signal region (1) and each of the I/O signals is mapped by the mapping data (2), and the point data (3) determines the address to which each of the mapped input signals is to be transferred. Namely, the addresses to which the input signals are to be transferred are determined by the mapping data (2) and the point data (3), and the input signals are then transferred to the I/O data region (4). Conversely, the input signals are transferred from the I/O data region (4) to the I/O signal region (1) by the point data (3) and the mapping data (2). Therefore, even if the arrangement of these I/O signals is changed, the change can be dealt with by changing the point data or the mapping data, without the need to change a sequence program.

3 Claims, 2 Drawing Sheets

SIGNAL TRANSFER SYSTEM OF PROGRAMMABLE CONTROLLER

TECHNICAL FIELD

The present invention relates to a signal transfer system of a programmable controller (PC) used to control a machine tool, and more specifically, to a signal transfer system of a PC by which the arrangement of I/O signals can be easily changed.

BACKGROUND ART

Programmable controllers (PCs) are widely used for the control, etc. of a machine tool. The programmable controller (PC) includes a programmable machine controller (PMC) incorporated in a numerical control apparatus and a programmable controller arranged independently of the numerical control apparatus.

Both of these PCs are interposed between the machine tool and the numerical control apparatus, to enable many I/O signals to be transferred therebetween, but the arrangement of these I/O output signals in the numerical control apparatus is different from that at the entrance of the PC. More specifically, the numerical control apparatus has a predetermined standard arrangement of I/O signals by which it adjusts itself to many kinds of machine tools, but each machine tool does not always use all of the I/O signals of the numerical control apparatus and thus has a different arrangement of the I/O signals. Accordingly, when a sequence program of the PC is created, the arrangement of these signals must be changed.

Nevertheless, when the number of the I/O signals is increased, a sequence program having a considerable number of steps must be created to change the arrangement of these signals, which imposes a burden upon the creation of the program. Further, when a detailed specification of a machine tool is changed, the sequence program must be changed, which makes the sequence program incompatible and causes maintenance problems.

DISCLOSURE OF THE INVENTION

Taking the above into consideration, an object of the present invention is to provide a signal transfer control system of a PC by which the arrangement of I/O signals is easily changed.

To solve the above problem, according to the present invention, there is provided a signal transfer control system of a programmable controller for transferring I/O signals between the PC and an external device, which comprises an I/O signal region for storing the I/O signal to the external device, mapping data for defining the mapping of the I/O signals, point data for defining the addresses to which the I/O signals are to be transferred, based on the mapping data, and an I/O data region for storing the I/O signals.

The input signals are stored in the I/O signal region and each of the I/O signals is mapped by the mapping data and the point data determines the address to which each of the mapped input signals is to be transferred. Namely, the addresses to which the input signals are to be transferred are determined by the mapping data and the point data, and the input signals are then transferred to the I/O data region. Conversely, the output signals are transferred from the I/O data region to the I/O signal region by the point data and the mapping data.

Therefore, even if the arrangement of these I/O signals is changed, the change can be dealt with by changing the point data or the mapping data without the need to change a sequence program.

BEST MODE OF CARRYING OUT THE INVENTION

An embodiment of the present invention will be described below with reference to drawings.

Figure 2:
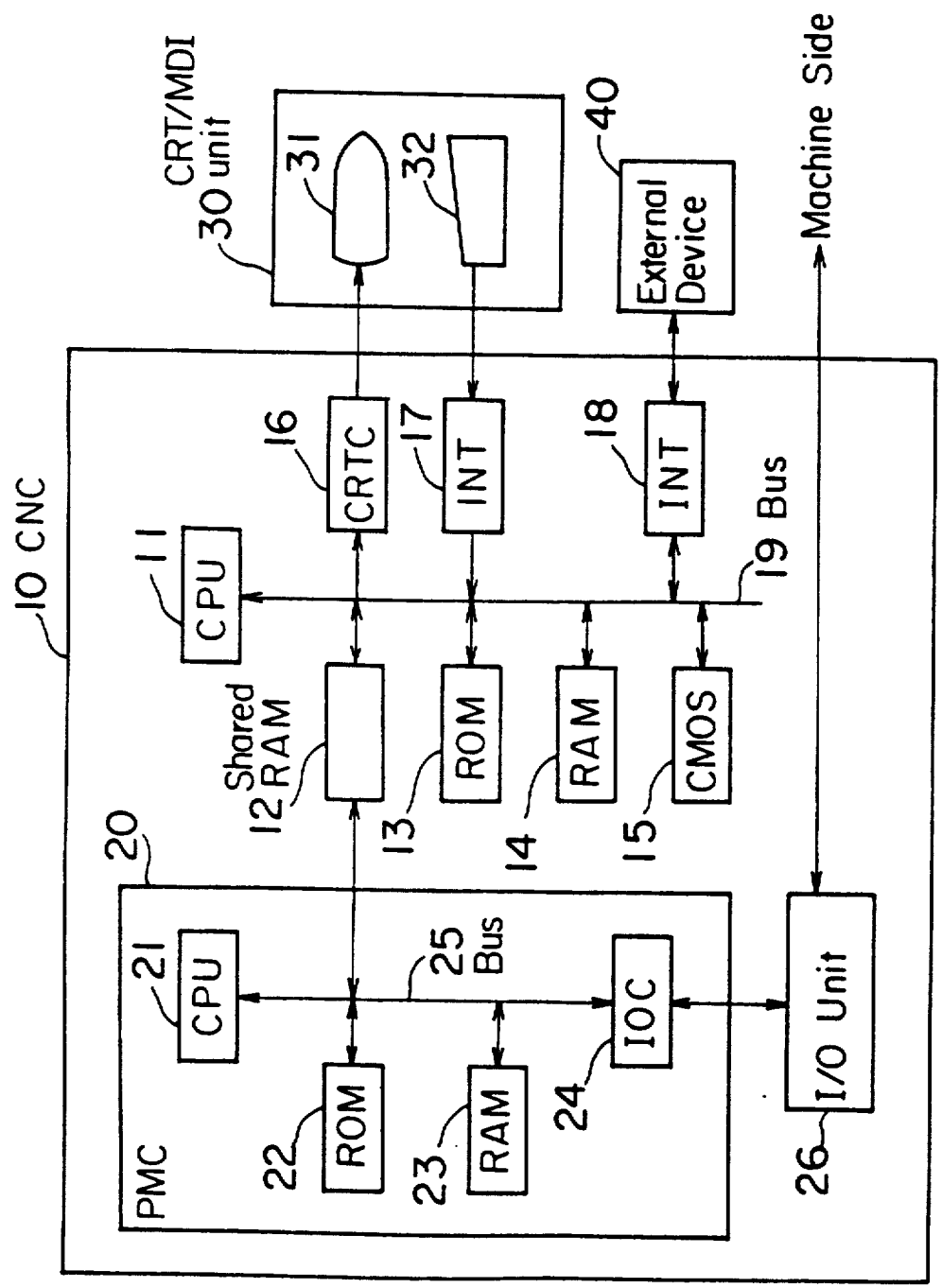
FIG. 2 is a block diagram of the entire hardware of a numerical control apparatus (CNC) embodying the present invention.

FIG. 2 is a block diagram of the entire hardware of a numerical control apparatus (CNC) embodying the present invention. A programmable machine controller (PMC) 20 is incorporated in a numerical control apparatus (CNC) 10, and a processor 11, which controls the numerical control apparatus (CNC) 10 as a whole, reads out a system program stored in a ROM 13, through a bus 19, and controls the numerical control apparatus (CNC) 10 as a whole according to the system program.

A shared RAM 12 enables the CNC 10 to transfer or receive data to or from the PMC 20, and thus the CNC 10 and PMC 20 transfer data to each other through the shared RAM 12. Further, the shared RAM 12 stores data needed to allow a simultaneous access by the CNC 10 and PMC 20.

A RAM 14 stores temporary calculation data, display data, and the like. A CMOS 15 is composed of a non-volatile memory which stores amounts of tool correction, amounts of pitch error correction, machining programs, parameters, and the like, and these data are maintained even after a power supply to the numerical control apparatus (CNC) 10 is cut off, because the CMOS is supplied with power from a not shown battery and is a non-volatile memory. Further, the CMOS 15 stores parameters and the like needed by the PMC 20.

A graphic control circuit 16 converts digital data such as the present position of each axis, an alarm, parameters, image data, and the like into image signals, and outputs same to a display unit 31 of a CRT/MDT unit 30, to be displayed thereat. Parameters, ladder diagrams and the like of the PMC 20 side can be also displayed at the display unit 31. Data at this time is supplied from the PMC 20 through the shared RAM 12.

An interface 17 receives data from the key board 32 in the CRT/MDI unit 30 and supplies same to a processor 11. Further, data to the PMC 20 can be input through the keyboard 32 and supplied to the PMC 20 through the shared RAM 12.

An interface 18 for external units is connected to an external unit 40 such as a paper tape reader, paper tape puncher, paper tape reader/puncher, printer, and the like, and machining program can be read from the paper tape reader, and a machining program edited in the numerical control apparatus (CNC) 10 can be output to the paper tape puncher.

The processor 11 is connected to the elements such as the shared RAM 12, ROM 13, and the like through the bus 19.

Note, an axis control circuit for controlling servo motors and the like, a servo amplifier, a spindle control circuit, a spindle amplifier, an interface for a manual pulse generator and the like, are not shown in the figure.

The programmable machine controller (PMC) 20 is provided with a processor 21 for the PMC, which is connected to the shared RAM 12 through a bus 25, and the shared RAM 12 is connected to the bus 19 of the CNC 10.

Further, a ROM 22 is connected to the bus 25, and stores a management program and sequence program for controlling the PMC 20. Although the sequence program is generally created by the use of a ladder program, it is sometimes created by a high-level language such as PASCAL or the like. Further, sometimes a ROM cassette interface is provided in place of the ROM 22, and a ROM cassette storing the sequence program is connected to the ROM cassette interface. With this arrangement, the sequence program can be easily upgraded and changed.

Further, a RAM 23 is connected to the bus 25 and stores an I/O signal, and the content thereof is rewritten as the sequence program is executed.

An I/O control circuit 24 is connected to the bus 25, converts an output signal stored in the RAM 23 to a serial signal, and transfers same to an I/O unit 26. Further, the I/O control circuit 24 converts a serial input signal from the I/O unit 26 to a parallel signal and transfers same to the bus 25. The signal is stored in the RAM 23 by the processor 21.

The processor 21 receives command signals such as an M function signal, T function signal and the like from the CNC 10 through the shared RAM 12. These command signals are temporarily stored in the RAM 23, processed according to the sequence program stored in the ROM 22, and then output to the I/O unit 26 through the I/O control circuit 24. These output signals control hydraulic units, pneumatic units, and magnetic units of a machine tool.

Further, the processor 21 receives input signals such as a limit switch signal on the machine side, a signal from an operation switch on a machine control panel and the like from the I/O unit 26, and temporarily stores these signals in the RAM 23. Input signals not required to be processed by the PMC 20 are transferred to the processor 11 through the shared RAM 12; other signals are processed by the sequence program and a part thereof output to the CNC, and the remaining signals are output as an output signal from the I/O unit 26 to the machine tool through the I/O control circuit 24.

Further, the sequence program can include commands for controlling the movement and the like of each axis, and when read by the processor 21, these commands are transferred to the processor 11 through the shared RAM 12, to control the servo motors. The spindle motors and the like may be similarly controlled by commands from the PMC.

Furthermore, the sequence program stored in the ROM 22 and the I/O signals stored in the RAM 23 may be displayed at the display unit 31 of the CRT/MDI unit 30.

Also, the sequence program of the ROM 22 may be output to the printer connected to the interface 18, through the shared RAM 12 and bus 19. A program creation device may be connected to the interface 18, a sequence program and the like created by the program creation device may be transferred to the RAM 23, and the PMC 20 may be operated by the sequence program in the RAM 23.

The arrangement of the I/O signals stored in the above RAM 23 is different from that of the I/O signals in the I/O unit. More specifically, the I/O signals in the RAM 23 have a standard arrangement because the RAM 23 transfers or receives signals to or from the CPU 11 through the shared RAM 12, whereas the arrangement of the I/O signals in the I/O unit 26 is determined depending on the arrangements of the limit switches, actuators and the like in the machine tool. Therefore, when the I/O unit 26 transfers or receives the I/O signals to or from the RAM 23, the arrangement of the I/O signals must be changed.

Figure 1:
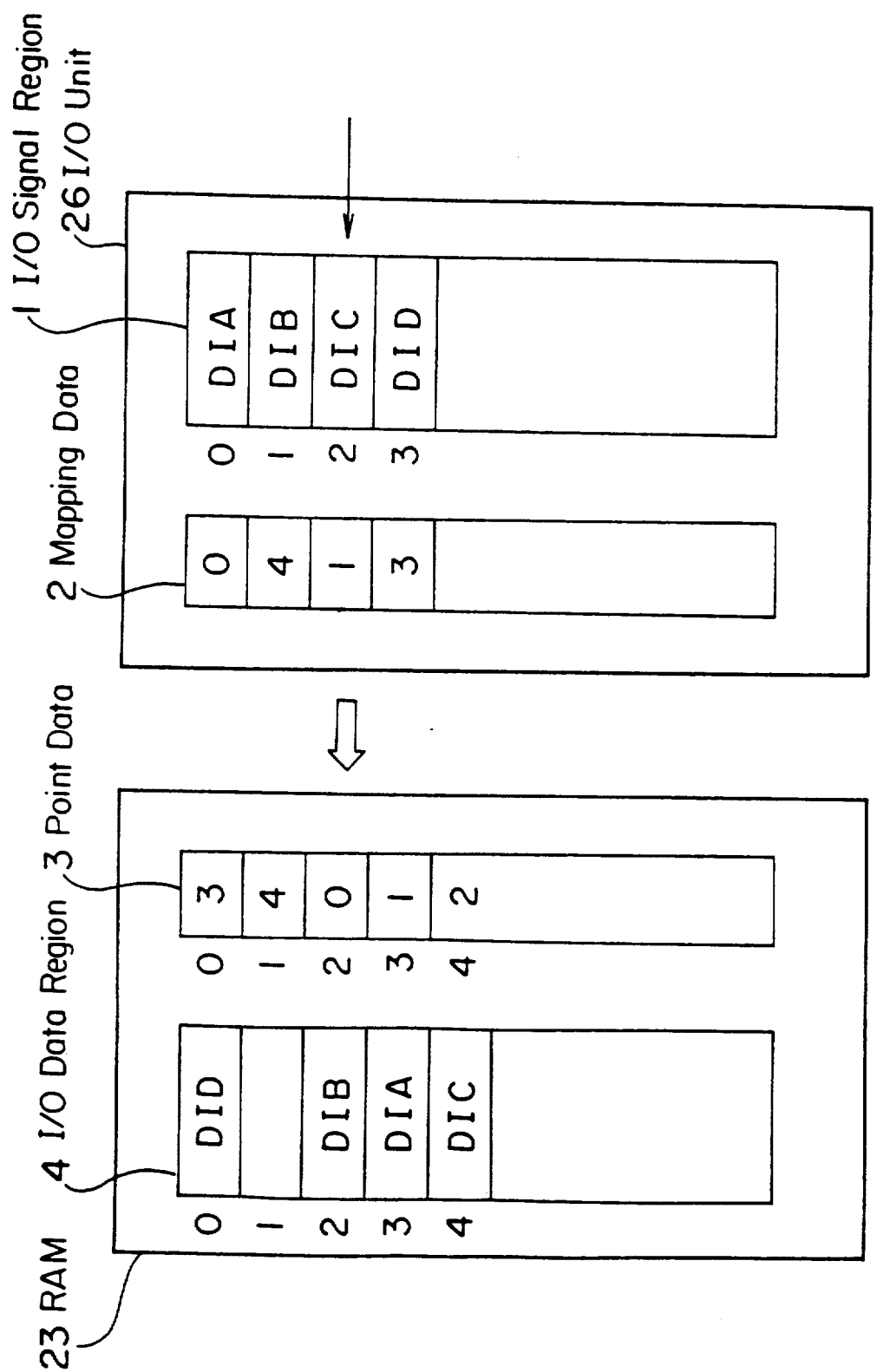
FIG. 1 is a diagram explaining the change of the arrangement of I/O signals of a signal transfer control system of a PC.

FIG. 1 is a diagram explaining the change of the arrangement of I/O signals in a signal transfer control system of a PC according to the present invention. The I/O unit 26 includes an I/O signal region 1 for storing I/O signals from the machine tool and mapping data 2, and further, the RAM 23 in the PMC 20 includes point data 3 and an I/O data region 4 for storing I/O signals as I/O data.

Since the arrangements of output signals and input signals are changed in the same manner, except that the direction of the former signals is opposite to that of the latter signals, only the change of the input signals will be described. Each 8 points of input signals from the machine tool are put together as one bite, and are stored in the I/O signal region 1. Note, some signals may not be used, and in this case, some bits in the 1 bite are not occupied.

Then, 0 is allocated to an input signal DIA stored in the address 0 of the I/O signal region 1 by the mapping data 2, and since 3 has been allocated to the address 0 of the point data, the input signal DIA is transferred to the address 3 of the I/O data region 4. In the same way, an input signal DIB is transferred to the address 2, an input signal DIC is transferred to the address 4, and an input signal DID is transferred to the address 0 of the I/O data region 4, respectively.

As described above, when the mapping data and the point data are used, even if the arrangements of the I/O signals in the I/O unit 26 and the RAM 23 are changed, the sequence program and the like do not need to be changed because only the mapping data or the point data are changed. The arrangement of the outputs signals can be changed in the same way.

Although the I/O signals are transferred in a bite unit in the above description, they can be transferred in a bit unit, but in this case, the mapping data and the point data must by arranged in the bit unit.

Further, although the I/O unit is incorporated in the numerical control apparatus, it may be provided in the controller of the machine tool.

Furthermore, although the PC is described as a programmable machine controller (PMC) incorporated in the numerical control apparatus, it may be a programmable controller (PC) provided independently of the numerical control apparatus.

As described above, according to the present invention, since the arrangement of the I/O signals is changed by using the mapping data and the point data, the arrangement of the I/O signals can be easily changed without the need to change the sequence program.

We claim:

1. A signal transfer control system for transferring I/O signals between a programmable controller and a machine tool, said system comprising:

an I/O unit operatively connected to the machine tool and including an I/O unit memory having I/O signal regions capable of storing the I/O signals and mapping data regions corresponding to said I/O signal regions and capable of storing mapping data to identify addresses of point data to be used in transfer of I/O signals in corresponding of said I/O signal regions; and a programmable controller including a programmable controller memory having point data regions at point data addresses capable of storing point data to identify addresses to which the I/O signals are to be transferred and I/O data regions capable of storing the I/O signals at I/O signal addresses, and a central processing unit operatively connected to transfer an I/O signal from an I/O signal region of said I/O unit memory to an I/O data region of said programmable controller memory by, first, retrieving an I/O signal from an I/O signal region of said I/O unit memory and retrieving corresponding mapping data from a corresponding mapping data region of said I/O unit memory, second, retrieving point data from a point data region at a point data address identified by the mapping data retrieved from the corresponding mapping data region of said I/O unit memory, and third, storing the retrieved I/O signal in an I/O data region of said programmable controller memory having an I/O signal address identified by the point data retrieved from the point data region of said programmable controller memory.

2. A signal transfer control system according to claim 1, wherein said programmable controller memory is provided in a RAM.

3. A signal transfer control system according to claim 2, wherein said programmable controller is a programmable machine controller operatively connected for control by a numerical control apparatus.

* * * * *